Sept. 1, 1925.

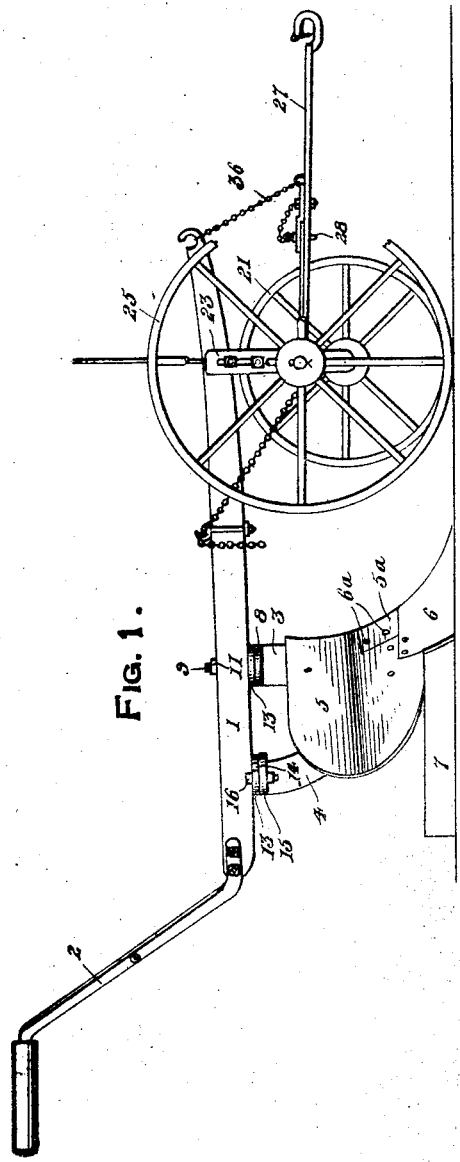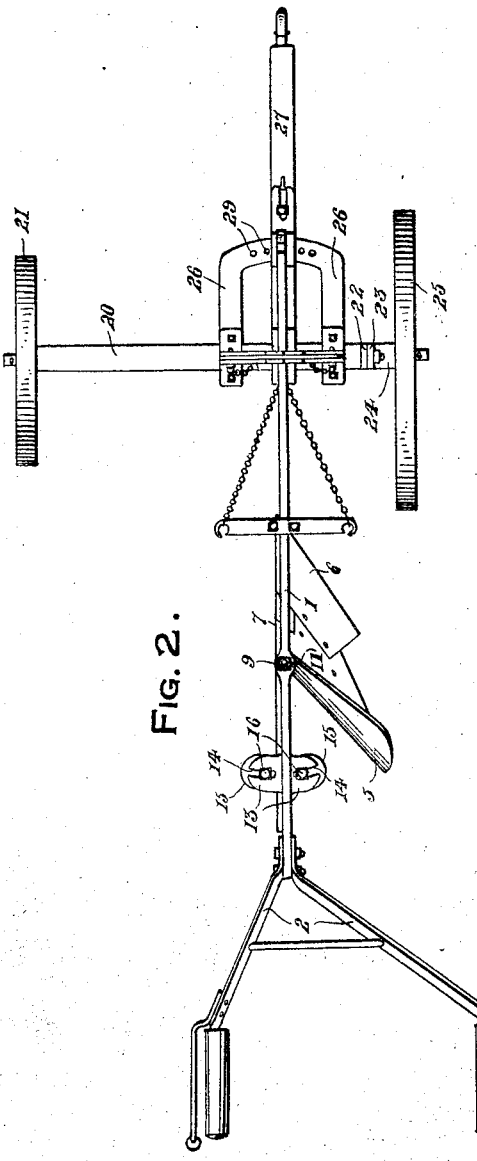

A. PATUS

PLOW

Filed June 13, 1924     2 Sheets-Sheet 2

1,552,229

Inventor
A. Patus

By Bryant & Lowry
Attorneys

Patented Sept. 1, 1925.

1,552,229

UNITED STATES PATENT OFFICE.

ALEXANDER PATUS, OF SOUTH BEND, INDIANA, ASSIGNOR OF ONE-HALF TO LOUIS NAGY, OF SOUTH BEND, INDIANA.

PLOW.

Application filed June 13, 1924. Serial No. 719,801.

*To all whom it may concern:*

Be it known that I, ALEXANDER PATUS, a citizen of Hungary, residing at South Bend, in the county of St. Joseph and State of Indiana, have invented certain new and useful Improvements in Plows, of which the following is a specification.

This invention relates to certain new and useful improvements in plows and has particular reference to the mounting of a plow upon the supporting beam to permit angular adjustments of the plow with respect to the beam.

The primary object of the invention resides in the provision of a plow that is pivotally supported at its upper forward end adjacent the upper edge of the mold board upon a plow beam while a bracket arm projecting rearwardly and upwardly of the mold board of the plow has an adjustable connection with the plow beam rearwardly of the forward pivotal plow mounting to permit lateral adjustments of the rear end of the plow and runner bar.

With the above and other objects in view and others that will appear as the nature of the invention is better understood, the same consists of the novel form, combination and arrangement of parts hereinafter more fully described, shown in the accompanying drawing and claimed.

Figure 3:
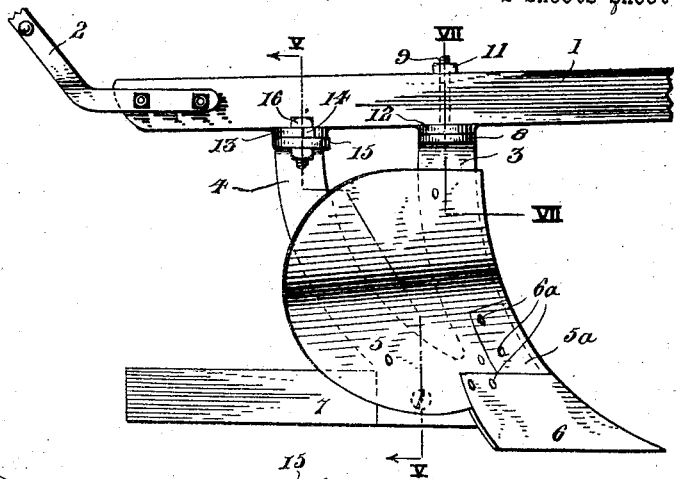
Figure 4:
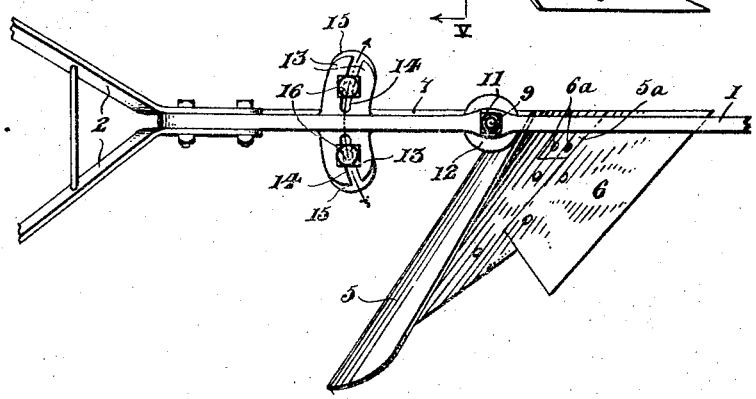
Figure 5:
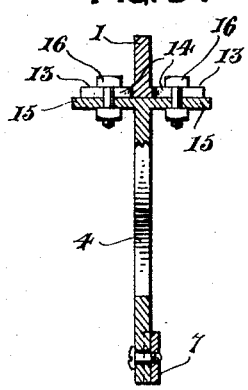
Figure 6:
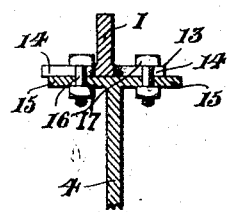
Figure 7:
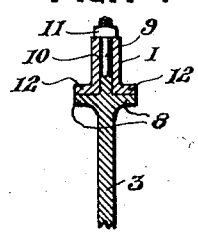

In the drawing, wherein like reference characters designate corresponding parts throughout the several views, Figure 1 is a side elevational view of a plow constructed in accordance with the present invention, Figure 2 is a top plan view thereof, Figure 3 is a fragmentary side elevational view of a plow constructed in accordance with the present invention, Figure 4 is a top plan view showing by arrow lines, the lateral adjustment for the rear end of the plow, Figure 5 is a vertical cross-sectional view taken on line V—V of Fig. 3 showing the adjustable mounting for the rear end of the plow, Figure 6 is a detail sectional view, similar to Fig. 5 illustrating the plow as being laterally shifted in one direction, and Figure 7 is a detail sectional view taken on line VII—VII of Fig. 3 showing the pivotal mounting of the forward end of the plow.

In the accompanying drawing which shows the preferred embodiment of the present invention, the reference numeral 1 designates a plow beam of usual construction having the handle bars 2 projecting rearwardly and upwardly from the rear end thereof.

The plow structure includes a pair of bars 3 and 4 respectively positioned forwardly and rearwardly and carrying a mold board 5, a plow point 6 and a runner 7 in any convenient manner, the mold board including a section 5ª secured in position by rivets 6ª. The upper end of the bar 3 is formed with a flat horizontal head 8 that carries an upwardly directed pin 9 freely extending through a vertical bore 10 in the plow beam 1, the upper end of the pin 9 being threaded for the reception of a retaining nut 11 that is moved into engagement with the upper end of the plow beam to provide a pivotal mounting for the forward end of the plow. The lower edge of the beam 1 carries lateral flanges 12 that are engaged by the head 8 upon the bar 3 as shown in Fig. 5 to provide a relatively wide bearing surface for the upper end of said bar.

The plow beam 1 adjacent the upper end of the bar 4 carries at its lower edge, oppositely directed arcuate flanges 13 concentric with the pivot pin 9 as shown in Fig. 2, the flanges 13 being provided with arcuate slots 14 opening at the ends thereof as shown. The upper end of the bar 4 carries oppositely extending arcuate flanges 15 upon which the flanges 13 rest and adjusting screw bolts 16 freely projecting through the slots 14 pass through openings 17 in the flanges 15 for holding the rear end of the plow in adjusted position.

As shown in Figs. 2 and 4, the runner bar 7 is disposed directly beneath the plow beam 1 while the bar 4 is vertically alined with the plow beam and is retained in such position by the adjusting screw bolts 16. When it is desired to dispose the plow at an angle to the longitudinal axis of the plow beam 1, the bolts 16 are loosened and the plow is laterally shifted upon its pivotal mounting at the upper end of the bar 3 and the nuts 16 are then tightened as illustrated in Fig. 6 for maintaining such position.

The plow in its entirety is shown in Figs. 1 and 2 wherein the forward end of the plow beam 1 is supported on a wheeled carriage. The plow carriage includes a cross bar 20 having a relatively small ground wheel 21 journaled on one end thereof while the other end of the cross bar is provided with a perpendicular extension 22 adjustably connected to the perpendicular extension 23 carried by the stub axle section 24 upon which the relatively large ground wheel 25 is journaled. A U-shaped frame 26 has its side portions secured to the cross bar 20 while a draft rod 27 is pivotally mounted at its rear end upon the cross bar 20 between the side legs of the U-shaped frame 26, the draft rod 27 having an opening therein for the reception of the pin 28 that is adapted for selective positioning in the face openings 29 in the forward cross portion of the frame 26 for changing the direction of pull upon the plow carriage.

From the above detail description of the device, it is believed that the construction and operation thereof will at once be apparent, and while there is herein shown and described the preferred embodiment of the present invention, it is nevertheless to be understood that minor changes may be made therein without departing from the spirit and scope of the invention as claimed.

What is claimed as new is:—

In a plow of the type described, a beam, a plow body including front and rear upwardly extending bars, a pivotal connection between the upper end of the front bar and the beam, an adjustable connection between the upper end of the rear bar and the beam, the pivotal connection between the front bar and beam including a pin projecting upwardly from the bar and said beam having an opening therein through which the pin projects, abutting bearing flanges on the bar and beam, a nut threaded on the end of the bar pin to hold it in the beam opening, the adjustable connection between the rear bar and beam including abutting oppositely extending arcuate flanges on the bar and beam centering on the pivotal mounting, one set of arcuate flanges having coextensive arcuate slots opening at the ends thereof and tightening bolts extending through the other set of flanges for engaging the slots of the first set to retain the plow in adjusted positions.

In testimony whereof I affix my signature.

ALEXANDER PATUS.